US010100378B2

(12) United States Patent
Meijer

(10) Patent No.: US 10,100,378 B2
(45) Date of Patent: Oct. 16, 2018

(54) METHOD TO OPERATE A SMELT CYCLONE

(71) Applicant: TATA STEEL NEDERLAND TECHNOLOGY B.V., Velsen-Noord (NL)

(72) Inventor: Hendrikus Koenraad Albertus Meijer, Uitgeest (NL)

(73) Assignee: TATA STEEL NEDERLAND TECHNOLOGY B.V., Velsen-Noord (NL)

( * ) Notice: Subject to any disclaimer, the term of this patent is extended or adjusted under 35 U.S.C. 154(b) by 64 days.

(21) Appl. No.: 15/104,400

(22) PCT Filed: Dec. 18, 2014

(86) PCT No.: PCT/EP2014/025027
§ 371 (c)(1),
(2) Date: Jun. 14, 2016

(87) PCT Pub. No.: WO2015/090623
PCT Pub. Date: Jun. 25, 2015

(65) Prior Publication Data
US 2016/0312320 A1    Oct. 27, 2016

(30) Foreign Application Priority Data
Dec. 19, 2013   (EP) ..................................... 13198314

(51) Int. Cl.
*C21B 5/00*     (2006.01)
*C21B 13/00*    (2006.01)
(Continued)

(52) U.S. Cl.
CPC ................ *C21B 5/006* (2013.01); *C21B 3/02* (2013.01); *C21B 13/0013* (2013.01);
(Continued)

(58) Field of Classification Search
CPC .................................. C21B 3/04; C21B 13/14
(Continued)

(56) References Cited

U.S. PATENT DOCUMENTS 5,013,355 A * 5/1991 Elvander ................. C21B 13/14
266/157
6,202,578 B1    3/2001 Ruottu et al.
(Continued)

FOREIGN PATENT DOCUMENTS

EP    0726326 A2    8/1996
EP    0735146 A1    10/1996
(Continued)

OTHER PUBLICATIONS

International Search Report and Written Opinion dated May 22, 2015 from International Application PCT/EP2014/025027 to Tata Steel Nederland Technology B.V. filed Dec. 18, 2014.

*Primary Examiner* — Scott R Kastler
(74) *Attorney, Agent, or Firm* — Vorys, Sater, Seymour amd Pease LLP

(57) ABSTRACT

A method of operating a smelt cyclone, wherein the supply of feed material and/or the supply of oxygen containing gas through an array of tuyeres into the smelt cyclone is controlled in order to control accretions of metalliferous feed material at the inside of the smelt cyclone.

15 Claims, 3 Drawing Sheets

(51) Int. Cl.
*C21C 5/56* (2006.01)
*C21B 3/02* (2006.01)
*C21B 13/10* (2006.01)
*F27B 3/02* (2006.01)
*F27B 3/22* (2006.01)
*F27D 3/16* (2006.01)
*F27D 3/18* (2006.01)
*F27D 21/00* (2006.01)
*F27D 19/00* (2006.01)

(52) U.S. Cl.
CPC ...... *C21B 13/0026* (2013.01); *C21B 13/0073* (2013.01); *C21B 13/10* (2013.01); *C21C 5/56* (2013.01); *F27B 3/02* (2013.01); *F27B 3/225* (2013.01); *F27D 3/16* (2013.01); *F27D 3/18* (2013.01); *F27D 21/0014* (2013.01); *F27D 2003/164* (2013.01); *F27D 2003/185* (2013.01); *F27D 2019/0003* (2013.01); *F27D 2019/0034* (2013.01); *Y02P 10/136* (2015.11)

(58) Field of Classification Search
USPC .......................................................... 266/157
See application file for complete search history.

(56) References Cited

U.S. PATENT DOCUMENTS

| | | |
|---|---|---|
| 6,273,931 B1 | 8/2001 | Denys |
| 6,440,195 B1 | 8/2002 | Dry |
| 2017/0176104 A1* | 6/2017 | Davis ........................ C21C 5/46 |

FOREIGN PATENT DOCUMENTS

| | | |
|---|---|---|
| WO | 9712177 A1 | 4/1997 |
| WO | 9902739 A1 | 1/1999 |
| WO | 0022176 A1 | 4/2000 |
| WO | 2012126055 A1 | 9/2012 |
| WO | 2013091847 A1 | 6/2013 |

* cited by examiner

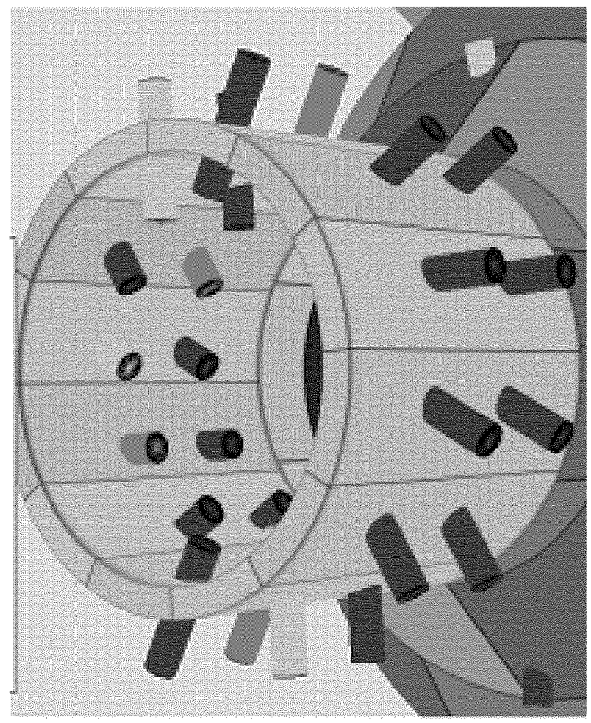
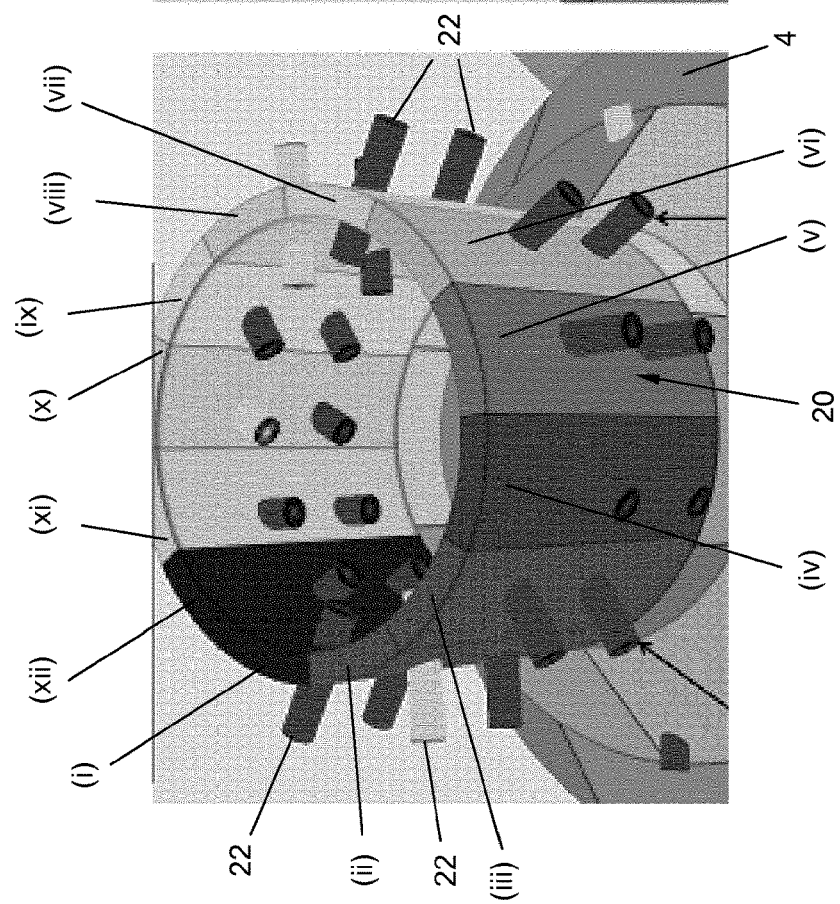
Fig. 2A
Fig. 2B

METHOD TO OPERATE A SMELT CYCLONE

CROSS-REFERENCE TO RELATED APPLICATIONS

This is a § 371 National Stage Application of International Application No. PCT/EP2014/025027 filed on Dec. 18, 2014, claiming the priority of European Patent Application No. 13198314.0 filed on Dec. 19, 2013.

FIELD OF THE INVENTION

The invention relates to a method to operate a smelt cyclone in a process for smelting a metalliferous material. In particular, although by no means exclusively, the present invention relates to the operation of a smelt cyclone in a process for smelting an iron-containing material, such as an iron ore, and producing iron.

BACKGROUND OF THE INVENTION

Smelt cyclones are typically used in the pre-reduction and melting of metalliferous material, such as iron oxides contained in iron ore. A smelt cyclone is a vessel defining a cylindrical chamber provided with means to inject metalliferous material and means to inject oxygen or an oxygen containing gas from a number of locations around the circumference of the chamber. Such smelting cyclones are known for instance from EP0726326 and EP0735146.

The metalliferous material and oxygen are injected in an about tangential direction therewith generating a vortex or whirling flow inside the cyclone. At the same time a reducing process gas is introduced into the cyclone which in combination with the injected oxygen is partly combusted resulting in sufficiently high temperatures to melt the metalliferous material. The vortex or whirling flow in the cyclone promotes mixing of the injected oxygen and the reducing process gas and also heat exchange with the metalliferous material. As a result of the swirl motion, particles of metalliferous material and molten metalliferous material are separated from the gas and collect on the wall of the cyclone wall from where they flow downward to accumulate in a vessel where final reduction takes place.

A known process for smelting a metalliferous material is referred to hereinafter as the "HIsarna" process. The process is carried out in a smelting apparatus that includes (a) a smelting vessel that includes solids injection lances and oxygen-containing gas injection lances and is adapted to contain a bath of molten metal and (b) a smelt cyclone for pre-treating a metalliferous feed material that is positioned above and communicates with the smelting vessel. The HIsarna process and apparatus are described in WO 00/022176.

The term "smelt cyclone" is understood herein to mean a vessel that typically defines a cylindrical chamber and is constructed so that feed materials supplied to the chamber move in a path around a vertical central axis of the chamber and can withstand high operating temperatures sufficient to at least partially smelt metalliferous feed materials.

In one form of the HIsarna process, carbonaceous feed material (typically coal) and flux (typically limestone, burnt lime or the like) are injected into a molten bath in the smelting vessel. Metalliferous feed material, such as iron ore is injected into and heated and partially melted and partially reduced in the smelt cyclone. This molten, partly reduced metalliferous material flows downwardly from the smelt cyclone into the molten bath in the smelting vessel and is smelted to molten metal in the bath. Hot, reaction gases (typically CO, $CO_2$, $H_2$, and $H_2O$) produced in the molten bath are partially combusted by oxygen-containing gas (typically technical-grade oxygen) in an upper part of the smelting vessel. Heat generated by the post-combustion is transferred to molten material in the upper section that falls back into the molten bath to maintain the temperature of the bath. The hot, partially-combusted reaction gases flow upwardly from the smelting vessel and enter the bottom of the smelt cyclone. Oxygen-containing gas (typically technical-grade oxygen) is injected into the smelt cyclone via tuyeres that are arranged in such a way as to generate a cyclonic swirl pattern about a central axis of the chamber of the smelt cyclone. This injection of oxygen-containing gas leads to further combustion of smelting vessel gases, resulting in very hot (cyclonic) flames. Finely divided incoming metalliferous feed and flux materials are injected pneumatically into these flames via tuyeres in the smelt cyclone, resulting in rapid heating and partial melting accompanied by partial reduction (roughly 10-20% reduction). The metalliferous feed and flux are injected in such a way as to create additional cyclonic swirl, adding to the swirl created by the oxygen-containing gas. The reduction is due to CO and $H_2$ in the reaction gases from the smelting vessel and also the heating of the hematite above is dissociation temperature. The hot, partially melted metalliferous feed material is thrown outwards onto the walls of the smelt cyclone by cyclonic swirl action and, as described above, flows downwardly into the smelting vessel below for smelting in that vessel.

The net effect of the above-described form of the HIsarna process is a two-step countercurrent process. Metalliferous feed material is heated and partially reduced by outgoing reaction gases from the smelting vessel (with oxygen-containing gas addition) and flows downwardly into the smelting vessel and is smelted to molten iron in the smelting vessel. In a general sense, this countercurrent arrangement increases productivity and energy efficiency.

Through development work, including a series of trials in a pilot plant, it was found that the heat flux/heat flux density on some water-cooled wall sections of the smelt cyclone is significantly less than other wall sections of the smelt cyclone. As a result of this a higher than normal amount of injected metalliferous feed material is entrained in off-gas leaving the smelt cyclone. This affects overall productivity of the HIsarna process because this feed material does not report to the smelting vessel and, therefore, does not contribute to molten metal production.

OBJECTIVES OF THE INVENTION

It is an objective of the present invention to provide a method to prevent the forming of large accretions against the inside wall of the cyclone.

It is another objective of the present invention to provide a method to remove accretions formed against the inside wall of the cyclone.

It is another objective of the present invention to provide a method to keep the gas flow patterns inside the cyclone as constant as possible during normal operation of the cyclone.

It is another objective of the present invention to provide a method that prevent an increase of metalliferous material leaving the cyclone with the off-gas.

It is another objective of the present invention to provide a method to keep the heat flux on the inside wall of the cyclone as constant as possible during normal operation.

DESCRIPTION OF THE INVENTION

It was found that a lower heat flux on cyclone wall sections is attributable to the forming of accretions in that location. The accretions insulate part of the inside wall sections from heat generated inside the smelt cyclone and thereby cause a non-uniform heat flux across the wall of the cyclone. In this description the expression "heat flux" is used which will mean either heat flux or heat flux density unless specified otherwise. These accretions also result in changes of the internal geometry of the smelt cyclone, which in turn is thought to cause an increase in metalliferous feed material leaving the smelt cyclone in the off-gas. More in particular these changes in geometry affect the gas flow patterns of the cyclonic swirl during operation, which changes result in that at least some of the injected metalliferous material is not exposed for long enough to the hot cyclonic flames produced by combustion of injected oxygen-containing gas with reaction gas from the smelting vessel. It is thought that it also results in that some metalliferous feed material is deflected from the cyclonic swirl into a stream of combustions gases leaving the smelt cyclone.

Metalliferous feed material means any material that contains metal oxides, for example metal ore, partly reduced ore or metal containing waste stream.

According to a first aspect of the invention one or more of the objectives of the invention are realized by providing a method of operating a smelt cyclone to control accretions of metalliferous feed material at the inside of the smelt cyclone, wherein the smelt cyclone is provided with an array of tuyeres to supply feed material and an oxygen containing gas into the smelt cyclone wherein the method comprises controlling the supply of feed material and/or oxygen containing gas.

According to a further aspect the smelt cyclone is provided with a cooling system with fluid-cooled panels in the wall of the smelt cyclone and wherein the supply of feed material and/or oxygen containing gas is controlled dependent on temperatures measured in the fluid-cooled panels. The temperatures can be measured by means of temperature sensors in the panels or by measuring the temperature of the cooling fluid of the fluid-cooled panels. The temperature differences measured with the temperature sensors or the temperature differences measured between in- and outgoing cooling fluid with respect to temperatures measured with normal operation are used to determine the heat flux and changes in the heat flux over time. In this respect "heat flux" is taken to mean the heat extracted via cooling panels associated with each wall section and is measured, for example, as $kW/m^2$.

By determining heat flux and changes in the heat flux over time the accretions can be localized. Accretions in this respect are typically large accretions meaning accretions that are large enough to give a significant change in the heat flux at the location of the accretion. The location of large accretions is indicated by a lower heat flux at that location or wall section of the smelt cyclone.

According to a further aspect it is provided that the supply of metalliferous feed material is reduced to below normal-operation supply rates through tuyeres used to inject metalliferous feed material to the smelt cyclone which are directed at areas with temperatures or heat fluxes that are below the temperatures or heat fluxes measured during normal-operation.

It has appeared that by reducing the supply of metalliferous feed material to the location of accretion that the accretion will disappear completely or to a large extent.

The accretions are typically localized, and as long as there are not too many accretions or accretions too large it will remain possible to remove the accretions and to continue to operate the smelt cyclone. This allows accretions in the smelt cyclone to be managed while the smelt cyclone continues to operate and therewith avoids the need for additional maintenance works to remove accretions outside of scheduled periodic maintenance cycles.

Controlling the wall heat flux profile of the smelt cyclone by adjusting the supply of metalliferous feed material and/or oxygen-containing gas through selected tuyeres allows targeted heat flux profile changes to occur primarily in regions affected by the accretions.

It is further provided that reducing the supply of metalliferous feed material comprises ceasing the supply of metalliferous feed material. By temporarily ceasing the supply of metalliferous feed material altogether the removal of the accretion can be accelerated.

According to a further aspect of the invention it is provided that the supply of metalliferous feed material is restored to normal-operation supply rates when the temperatures or heat fluxes in the areas with temperatures or heat fluxes that previously were below the temperatures or heat fluxes measured during normal-operation are restored to the level measured during normal-operation.

According to another aspect of the invention the supply of oxygen-containing gas is increased to above normal-operation supply rates through tuyeres used to inject oxygen-containing gas to the smelt cyclone which are directed at areas with temperatures or heat fluxes that are below the temperatures or heat fluxes measured during normal-operation. By supplying extra oxygen-containing gas the temperature of the combustion process is increased at or near the location of the accretion therewith contributing in the removal of the accretion.

It was found that the heat flux across wall sections of the smelt cyclone can be made generally uniform, taking into account normal operational tolerances, by controlling conditions in the smelt cyclone to heat and melt accretions. The conditions can be controlled during operation of the HIsarna process such that the accretions can be reduced in size, at least, to an extent that their impact on the HIsarna process is substantially removed. In such circumstances, size-reduced accretions may remain in the smelt cyclone and the heat flux may still vary between wall sections, but within normal operational tolerances.

According the invention a further method of operating a smelt cyclone to control accretions of metalliferous feed material at the inside of the smelt cyclone is provided, wherein the smelt cyclone is provided with an array of tuyeres to supply feed material and an oxygen containing gas into the smelt cyclone wherein the method comprises ceasing or reducing the supply of feed material and/or oxygen containing gas through selected tuyeres.

According a further aspect of the invention it is provided that the tuyeres are selected according a predetermined order. According to another aspect the supply through these selected tuyeres is reduced or ceased during a predetermined period of time.

According to still a further aspect of the invention it is provided that the selection of tuyeres is in consecutive order wherein all tuyeres are selected one after the other, or in a successive order wherein one or more tuyeres in between selected tuyeres are skipped in a first pass and selected in a further pass.

According to a further aspect of the invention it is provided that the ore supply rate is kept constant and that the supply of oxygen through selected tuyeres is increased in order to increase the temperature of the combustion process at corresponding locations in order to control is increased accretions of metalliferous feed material at the inside of the smelt cyclone.

The metalliferous feed material may be an iron-containing feed material, such as an iron ore. In that event, the process may be characterised by maintaining a temperature of at least 1100° C., typically at least 1200° C. in the smelt cyclone.

The metalliferous material may be externally pre-heated before it is injected.

The method may comprise maintaining the oxygen potential in the smelt cyclone that is sufficient so that the off gas from the smelt cyclone has a post combustion degree of at least 70%.

The metalliferous feed material may be in the form of granulated material or fines.

The method may comprise selecting the particle size of the metalliferous feed material to be supplied to the smelt cyclone to be no more than 6 mm.

The method may comprise selecting the particle size of the metalliferous feed material to be supplied to the smelt cyclone to be no more than 3 mm.

The metalliferous feed material to be supplied to the smelt cyclone is preferably less than 1 mm.

The invention also provides a direct smelting process for smelting metalliferous feed material to molten metal, the method comprising:
(a) supplying the metalliferous feed material and oxygen-containing gas via tuyeres into a smelt cyclone and partially melting and partially reducing the metalliferous feed material;
(b) transferring the partially molten and partially reduced metalliferous feed material to a molten bath of metal and slag contained in a direct smelting vessel;
(c) supplying carbonaceous material to the molten bath to smelt the metalliferous feed material to molten metal and to produce a reaction gas;
(d) supplying oxygen-containing gas to a space in the direct smelting vessel above the molten bath to post-combust the reaction gases;
(e) transferring at least some of the reaction gas to the smelt cyclone for post-combustion with the oxygen-containing gas supplied via the tuyeres to generate heat to partially melt and partially reduce the metalliferous feed material; and
(f) wherein the method comprises controlling accretions of metalliferous feed material in the smelt cyclone by controlling the supply of metalliferous feed material and/or oxygen-containing gas to the smelt cyclone as described above.

BRIEF DESCRIPTION OF THE DRAWINGS

The invention will be further explained on hand of the example shown in the drawing, in which:

FIGS. 2A and 2B are perspective views of a smelt cyclone located on top of a direct smelting vessel with FIG. 2A showing low heat flux wall sections of the smelt cyclone shaded darkly and normal heat flux wall sections not or lightly shaded and with FIG. 2B showing a smelt cyclone without any significant accretions on the wall sections;

DETAILED DESCRIPTION OF THE DRAWINGS

Figure 1:
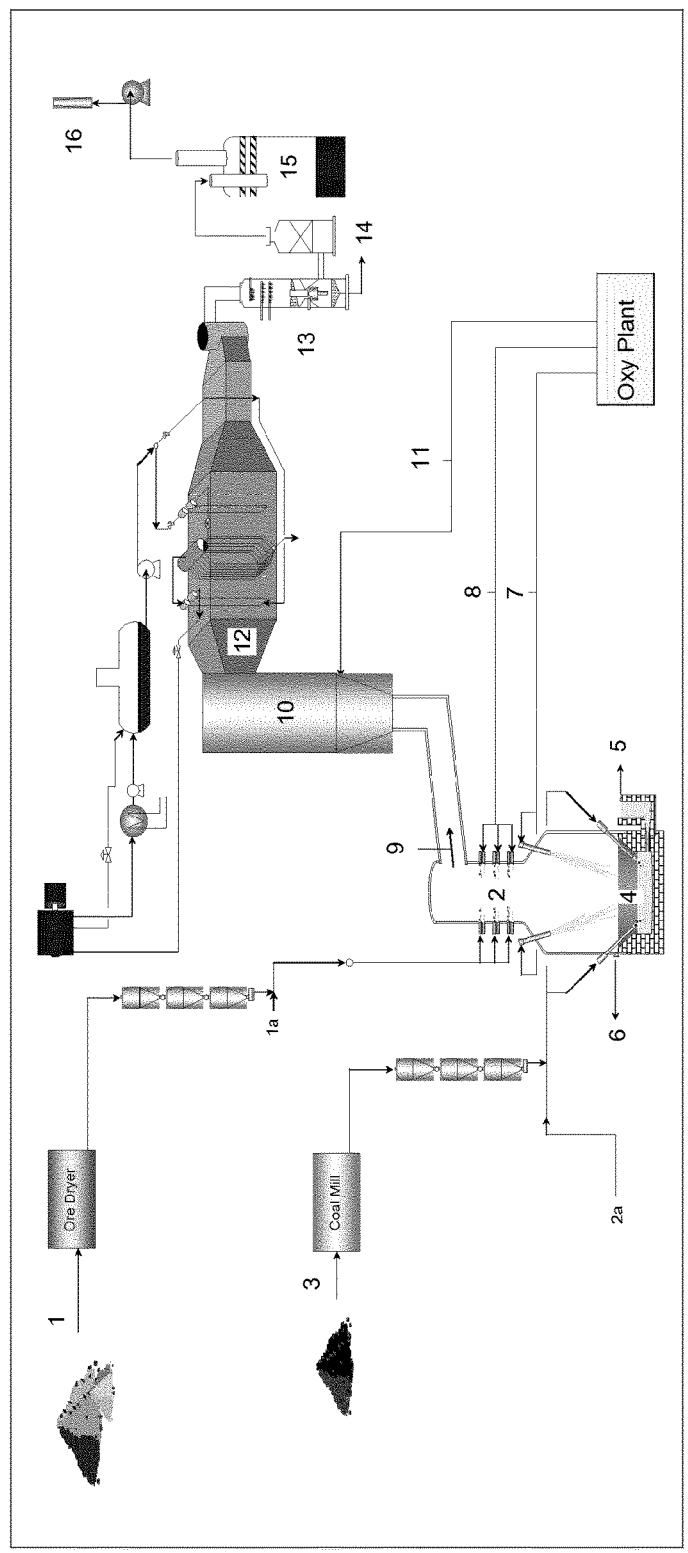
FIG. 1 is a schematic diagram which illustrates one embodiment of an plant for direct smelting metalliferous feed material to molten iron in accordance with the present invention.

The process and the apparatus shown in the FIG. 1 is based on the use of an apparatus that includes a smelt cyclone 2 and a molten bath-based direct smelting vessel 4 located directly beneath the smelt cyclone 2, with direct communication between the chambers of the smelt cyclone 2 and the smelting vessel 4.

A blend of hematite-based ore (or other iron ore) with a top size of 1 mm and flux (such as limestone, burnt lime and the like) 1 is fed, via an ore dryer, into the smelt cyclone 2 using a pneumatic conveying gas 1a. Flux represents roughly 8-10 wt % of the combined stream of ore and flux. Coal 3 is fed, via a separate dryer, to the smelting vessel 4 where it is injected into a molten bath of metal and slag using conveying gas 2a. Oxygen 7 is injected into the direct smelting vessel 4 to post-combust gases, typically CO and $H_2$, generated in and released from the molten bath and provide the necessary heat for the smelting process in the bath. Oxygen 8 is injected into the smelt cyclone 2 to preheat and partly melt the ore.

The operating conditions, including but not limited to, coal and ore feed rates, oxygen feed rates to the direct smelting vessel 4 and the smelt cyclone 2 and heat losses from the smelting vessel 4, are selected so that off-gas leaving the smelt cyclone 2 via an off-gas outlet duct 9 has a post-combustion degree of at least 90%.

Off-gas from the smelt cyclone 2 passes via an off-gas duct 9 to an off-gas incinerator 10, where additional oxygen 11 is injected to burn residual $CO/H_2$ and provide a degree of free oxygen (typically 1-2%) in the fully combusted flue gas.

Fully combusted gas then passes through a waste heat recovery section 12 where the gas is cooled and steam is generated. Flue gas then passes through a wet scrubber 13 where cooling and dust removal are achieved. The resulting sludge 14 is available for recycle to the smelter via the ore feed stream 1.

Cool flue gas leaving the scrubber 13 is fed to a flue gas desulphurisation unit 14. Clean flue gas is then vented via a stack. This gas consists mainly of $CO_2$ and, if appropriate, it can be compressed and geo-sequestered (with appropriate removal of residual non-condensable gas species).

Figure 3:
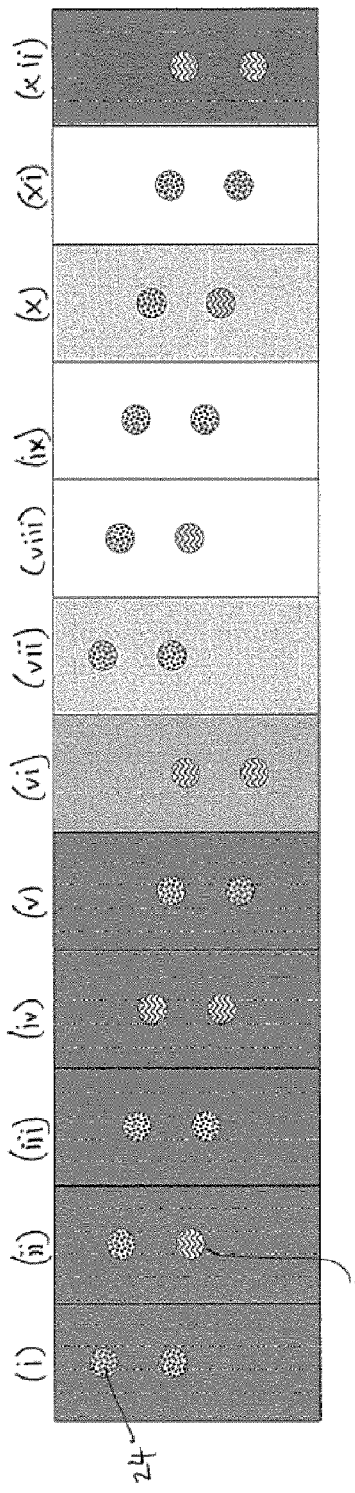
FIG. 3 shows the wall sections in FIG. 2 set out side-by-side showing a configuration of tuyeres during normal operation with accretions.

The smelt cyclone 2 is formed in this example by 12 wall sections 20, in the form of arcuate water-cooled panels. Each wall section 20 includes two tuyeres 22 that extend obliquely through the wall sections 20 to inject the ore and oxygen and generate the cyclonic swirl. Some tuyeres 12 inject ore and others injection the oxygen. An example of a configuration of ore-injecting tuyeres 24 and oxygen-injecting tuyeres 26 under normal operating conditions is shown in FIG. 3. Specifically, the wall sections 20 in FIG. 3 are set out side-by-side in the order denoted by roman numerals (I)

to (xii) in FIG. 2. The same wall sections 20 in FIGS. 2 and 3 are denoted by the same roman numeral.

Figure 4:
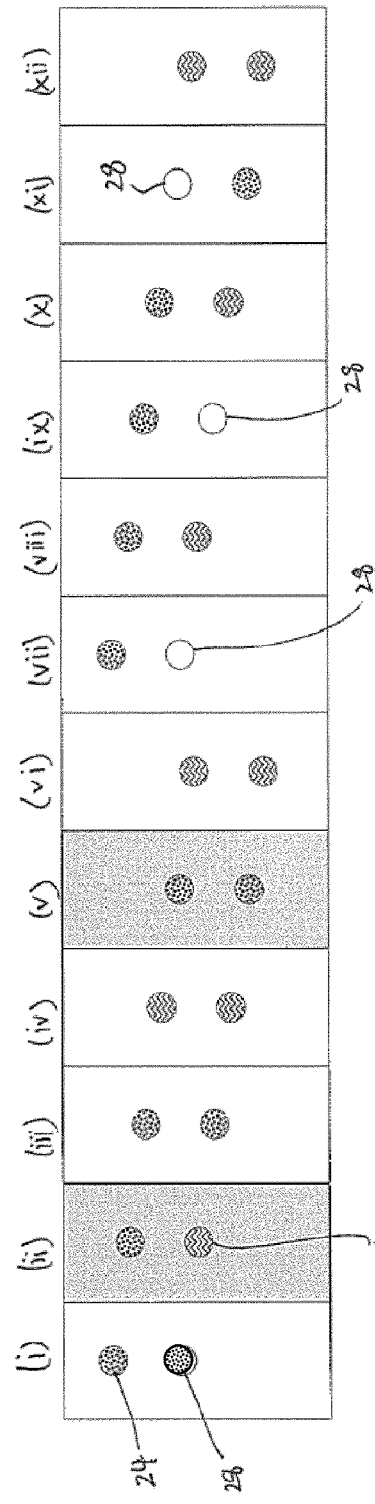
FIG. 4 shows the wall sections in FIG. 3 with a revised configuration of tuyeres that causes the heat flux on the wall sections to change to become generally uniform.

Each wall section 20 includes two tuyeres and the sequence of wall sections 20 in FIGS. 3 and 4 shows that the tuyeres 24 and 26 are located progressively further from the top of each wall section 20 over wall sections 20 in a first set denoted by roman numerals (i) to (vi) and the pattern is repeated in wall sections 20 in a second set denoted by roman numerals (vii) to (xii). This means that, when arranged to form the smelt cyclone 2, as in FIG. 2, each wall section 20 in the second set has tuyeres 22 located at the same vertical position as tuyeres 22 on a wall section 20 located directly opposite in the first set.

In FIGS. 3 and 4, the heat flux is represented by shading of wall sections 20. Darker shading represents a lower heat flux compared with a normal operating heat flux. Wall sections (vi) to (xi) in FIGS. 2 and 3 have a heat flux that is representative of a normal heat flux under normal operating conditions. Wall sections (i) to (v) and (xii) are shaded darker to represent a lower than normal heat flux as a result of insulation from cyclonic flames by accretions of fine ore particles. It was determined that the accretions can be reduced to the extent that they have a negligible impact on performance of the smelt cyclone 2 by adjusting the supply of ore and ore oxygen. In this embodiment, the supply of ore is stopped through tuyeres 28 on wall sections (vii), (ix) and (xi), i.e. generally opposite to wall sections (i) to (v) and (xii) which have a lower than normal heat flux, see also Table 1. In this embodiment, the supply of oxygen continues at the normal supply rate.

TABLE 1

| Ore injector | Impacted panels | |
| --- | --- | --- |
| i | vi | vii |
| iii | viii | ix |
| v | x | xi |
| vii | xii | i |
| ix | ii | iii |
| xi | iv | v |

The ore-injecting tuyeres 24 and oxygen-injecting tuyeres 26 generally alternate around the smelt cyclone 2. Accordingly, the tuyeres 24 through which ore supply is to be switched off may not be directly opposite to wall section with low heat flux, but may be close to opposite.

The effect of stopping ore supply is to enable available heat in the smelt cyclone 2 to heat and melt the accretions. In other words, the heat input requirements to heat and at least partially melt the ore that is injected at the normal supply rates is reduced and the heat generated by combustion of reaction gas with injected oxygen continues to be generated at the normal rate. Accordingly, there is excess heat for the quantity of supplied ore. It is this excess heat that causes accretions to melt.

Additionally, the effect is localized to the regions on the wall sections (i) to (v) where accretions are most likely to occur. From pilot plant work, the applicant found that accretions typically form around the tuyeres 22 and can even block supply of ore or oxygen completely through a tuyere.

The progress of reducing the size of accretions can be monitored by tracking the heat flux on the wall sections 20. When the heat flux returns to a heat flux that is generally representative of a heat flux under normal operating conditions, the supply of ore though tuyeres 28 on wall sections (vii), (ix) and (xi) may resume to the normal ore supply rate.

Although this embodiment concerns stopping supply of ore, it will be appreciated that another embodiment involves reducing the supply of ore to a rate that still enables available heat to heat and melt accretions.

In an alternative embodiment, the supply of ore is maintained and the supply of oxygen is increased to provide more heat for heating and melting accretions. In this embodiment, as with other embodiments described above, the supply of oxygen is increased through tuyeres 26 that are generally opposite to wall sections 20 that have a lower than normal heat flux. For example, the supply of oxygen may be increased through tuyeres 26 on wall sections (vi), (viii) and (x). Normal operating supply rates of oxygen are resumed when the heat flux on wall sections (i) to (v) and (xii) return to a heat flux representative of a heat flux under normal operating conditions.

In a further alternative embodiment, the supply of ore and oxygen may be adjusted. Specifically, the supply of ore may be reduced as described above and the supply of oxygen may be increased as described above.

As the adjustment in supply of ore and/or oxygen is limited to a small number of the total number of tuyeres, the remaining tuyeres can continue supplying ore and oxygen under normal operating conditions. This means that the smelt cyclone can continue operating, albeit with reduced productivity, while the accretions are removed. By spreading the missing ore supply over the remaining tuyeres in operation the productivity can be kept at the same level as before. This avoids the need for shutting down the smelt cyclone 2 and the direct smelting vessel 4 for maintenance to remove the accretions. Furthermore, it enables overall production to continue. The method of controlling accretions as described in reference to the above embodiments can manage accretions throughout a smelting campaign when signs appear that accretions may be forming. Accordingly, it is anticipated that the method will be used to limit accretion growth and, if necessary, to reduce the size of accretions.

The invention claimed is:

1. A method of operating a smelt cyclone having
   a cooling system comprising fluid-cooled panels in a wall of the smelt cyclone, said fluid-cooled panels make up the cylindrical sidewalls of the smelt cyclone to define an inside cavity of a cylindrical chamber, wherein each fluid-cooled panel respectively defines a portion of inside surface area of the inside sidewalls of the smelt cyclone, and
   an array of tuyeres to control accretions of metalliferous feed material at the inside of the smelt cyclone, wherein said tuyers respectively protrude from said fluid-cooled panels to be respectively directed at other said fluid-cooled panels generally opposite the tuyeres, the method comprising:
   introducing a supply of metalliferous feed material and/or oxygen containing gas through the array of tuyeres into the smelt cyclone;
   measuring respective temperatures in the smelt cyclone fluid-cooled panels to define respective heat fluxes which are heat extracted via the respective fluid-cooled panels;
   and
   controlling the supply of metalliferous feed material and/or oxygen containing gas to the smelt cyclone in response to the measured temperatures or the heat fluxes;
   wherein said controlling the supply of metalliferous feed material and/or oxygen containing gas to the smelt cyclone comprises decreasing the supply of metalliferous feed material and/or increasing the supply of oxygen containing gas through at least one selected tuyere respectively directed at the portion of inside surface area of the inside sidewalls defined by the respective said smelt cyclone fluid-cooled panel generally opposite the selected tuyere and having said measured temperature or heat flux below said measured temperature or heat flux of other said smelt cyclone fluid-cooled panels.

2. The method according to claim 1, wherein sensors in the fluid-cooled panels measure the temperatures in the fluid-cooled panels.

3. The method according to claim 1, wherein a temperature of a cooling fluid in the fluid-cooled panels is measured.

4. The method according to claim 1, wherein the supply of metalliferous feed material is decreased through the tuyeres that are directed at the areas of the smelt cyclone fluid-cooled panels generally opposite the tuyeres and having said measured temperatures or heat fluxes below the measured temperatures or heat fluxes of the other areas of the smelt cyclone fluid-cooled panels.

5. The method according to claim 4, wherein the supply of metalliferous feed material is ceased through the tuyeres that are directed at the areas of the smelt cyclone fluid-cooled panels generally opposite the tuyeres and having said measured temperatures or heat fluxes below the measured temperatures or heat fluxes of the other areas of the smelt cyclone fluid-cooled panels.

6. The method according to claim 4, further comprising: restoring the supply of metalliferous feed material once the temperatures or heat fluxes increase.

7. The method according to claim 4, wherein the supply of oxygen containing gas is increased.

8. The method according to claim 7, further comprising: restoring the supply of oxygen containing gas once the temperatures or heat fluxes increase.

9. The method according to claim 1, wherein the metalliferous feed material is an iron-containing feed material.

10. The method according to claim 9, wherein the temperatures are maintained at least at 1100° C.

11. The method according to claim 1, wherein an oxygen potential in the smelt cyclone is controlled so that off-gas from the smelt cyclone has a post combustion degree of at least 70%.

12. The method according to claim 1, wherein the metalliferous feed material is externally preheated before being fed to the smelt cyclone.

13. The method according to claim 1, further comprising: selecting a particle size of the metalliferous feed material to be no more than 6 mm.

14. A method of operating a smelt cyclone having
a cooling system comprising fluid-cooled panels in a wall of the smelt cyclone, said fluid-cooled panels make up the cylindrical sidewalls of the smelt cyclone to define an inside cavity of a cylindrical chamber, wherein each fluid-cooled panel respectively defines a portion of inside surface area of the inside sidewalls of the smelt cyclone, and
an array of tuyeres to control accretions of metalliferous feed material at the inside of the smelt cyclone wherein said tuyers respectively protrude from said fluid-cooled panels to be respectively directed at other said fluid-cooled panels generally opposite the tuyeres, the method comprising:
introducing a supply of metalliferous feed material and/or oxygen containing gas through the array of tuyeres into the smelt cyclone;
measuring respective temperatures in the smelt cyclone fluid-cooled panels to define respective heat fluxes which are heat extracted via the respective fluid-cooled panels;
ceasing or reducing the supply of metalliferous feed material through at least one selected tuyere respectively directed at the portion of inside surface area of the inside sidewalls defined by the respective said smelt cyclone fluid-cooled panel generally opposite the selected tuyere and having said measured temperature or heat flux below said measured temperature or heat flux of other said smelt cyclone fluid-cooled panels.

15. The method of claim 9, wherein the iron-containing feed material is iron ore.

* * * * *